June 26, 1945. A. WESTLAKE 2,379,206
MEANS FOR HOLDING COOKING UTENSILS ON GALLEY RANGES
Filed Nov. 25, 1941
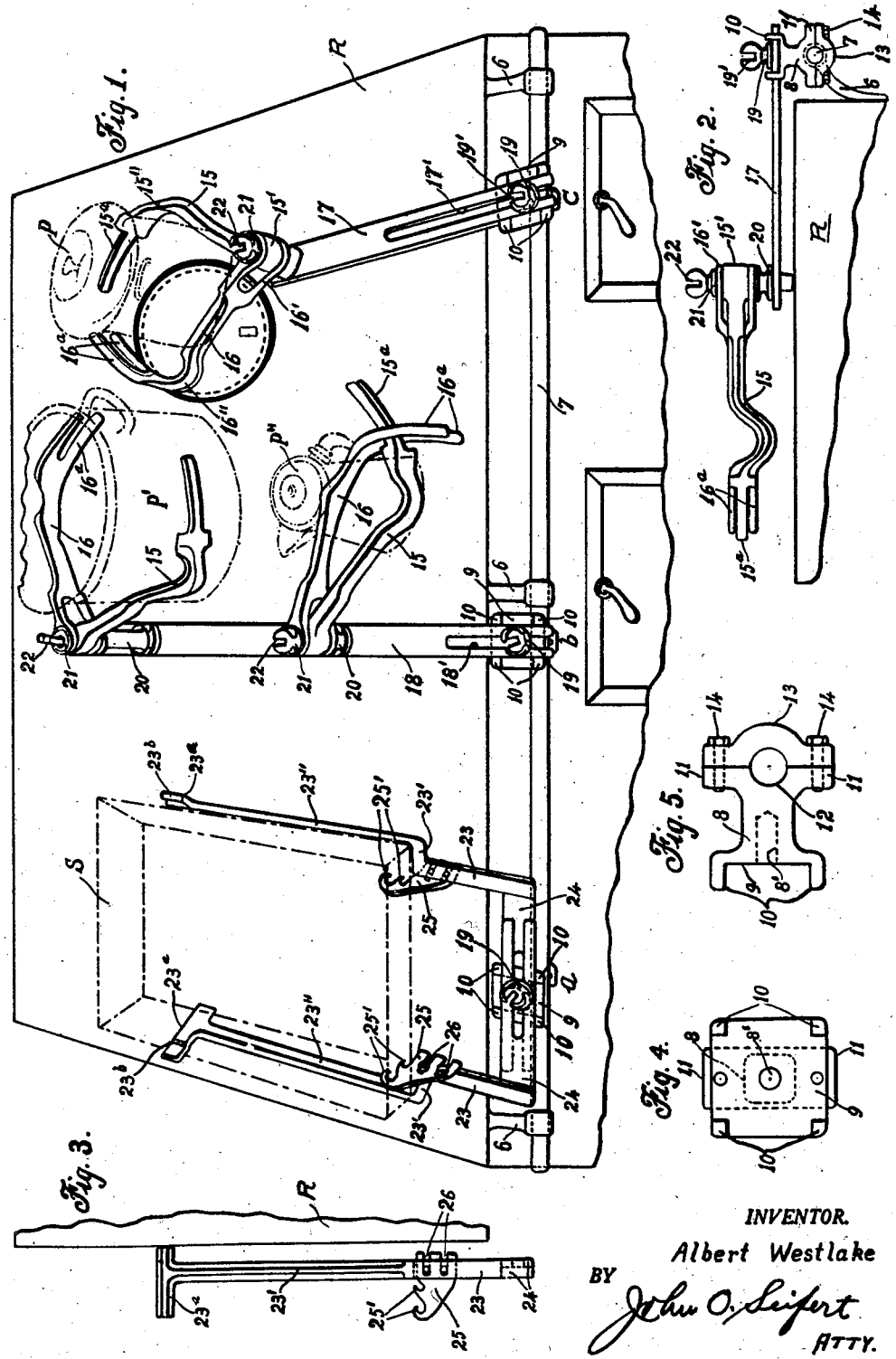
INVENTOR.
Albert Westlake
BY John O. Seifert
ATTY.

Patented June 26, 1945

2,379,206

UNITED STATES PATENT OFFICE 2,379,206

MEANS FOR HOLDING COOKING UTENSILS ON GALLEY RANGES

Albert Westlake, New York, N. Y., assignor, by direct and mesne assignments, of one-half to Mary A. Westlake, New York, N. Y., and one-half to Martha C. Reed, Danbury, Conn.

Application November 25, 1941, Serial No. 420,328

6 Claims. (Cl. 126—24)

This invention relates to means for holding cooking utensils on ranges, and while it is adapted for use with any form of cooking range it is particularly adapted for use with galley cooking ranges for marine vessels to prevent cooking utensils from tipping over or moving off from the range by the rolling and pitching movements of the vessel due to sea conditions.

It is an object of the invention to provide in connection with a galley range means to engage and hold cooking utensils of different sizes and shapes upon the galley range to prevent the utensils from tipping over and moving laterally from the range, which may be readily manipulated into and out of engaging and holding position and releasably locked in utensil engaging position, and to provide supports for said means and means for mounting said supports on the range to have adjustment longitudinally of the front of the range and adapted for the interchangeable mounting of the supports to extend transversely and have adjustment relative to the top of the range to position the supports with the utensil engaging and holding means to hold utensils on different desired portions of the range.

It is a further object of the invention to provide devices for releasably engaging opposite sides and over a side wall portion of cooking utensils upon a galley range to hold and prevent lateral movement of cooking utensils upon the range, and means mounted on and adjustable longitudinally of the front of the range to support said utensil engaging and holding means to extend transversely of the range and have adjustment toward and away from each other to engage and hold cooking utensils of different sizes upon the range.

Other objects and advantages of the invention will hereinafter appear.

In the drawing accompanying and forming a part of this application,

Figure 1 is a schematic view looking at the top of a galley cooking range or stove and showing cooking utensils engaging or gripping and holding means in one position of adjustment in relation to the top thereof.

Figure 2 is a side elevation of a cooking utensil gripping and holding device and adjustable supporting means therefor shown at the right of Figure 1 and showing the same in relation to the top of the cooking range.

Figure 3 is a side elevation of a cooking utensil engaging and holding device shown at the left of Figure 1 and showing the same in relation to the top of the cooking range.

Figure 4 is a plan view of a support for a cooking utensil engaging or gripping and holding device; and Figure 5 is an end elevation of the support shown in Figure 4 looking at the right thereof.

The embodiment of the invention illustrated in the drawing is shown in connection with a cooking range R only so much of the cooking range being shown as is essential to an understanding of the invention. Brackets 6 fixed to and extending laterally from the range support a rail 7 to extend longitudinally of the range, preferably the front thereof, and disposed in a plane below the top of the range. A series of supports, shown in plan and side elevation in Figures 4 and 5, are releasably mounted on the rail 7 to have adjustment longitudinally of the rail. Each of the supports consists of a support proper 8 having an upper rectangular flat surface 9 arranged with lugs 10 of rectangular form in cross section extended upwardly from the corners thereof and said lugs arranging said surface 9 with intersecting guideways for a purpose hereinafter described. The supports are provided opposite the flat surface 9 with laterally extending ears 11 having a semicircular recess 12 in the face thereof midway the ears 11, said recess being in an arc of a circle having a radius substantially the same as the rail 7 and adapted to be engaged therewith. The supports which are in the nature of brackets are secured to the rail by caps or cleats 13 having a surface adapted to be opposed to and conforming to the surface of the ears with the recess 12 and adapted to be engaged at the side of the rail opposite the supports and secured to the supports by screws 14. It will be obvious that the supporting brackets may be adjusted longitudinally on the rail by releasing the caps 13 and secured in adjusted position on the rail by drawing the caps to the supports by the screws 14. In the present instance three of said supporting brackets are utilized, as shown at a, b and c in Figure 1, although a greater or less number may be utilized depending on the number of the cooking utensil engaging or gripping and holding devices. The distance of the surface 9 of the supporting brackets 8 from the surface of the ears 11 is such so that when the supports are mounted on the rail 7 the flat surface of the supports will be disposed in a plane above the top of the range or stove, as shown in Figure 2.

A series of cooking utensil engaging or gripping and holding devices are utilized, each of said devices comprising a pair of arms. Certain of said devices each comprise a pair of arms 15, 16, one pair of said arms being pivotally mounted at one end on a bar 17, and two pair of said arms are pivotally mounted on a bar 18. The bars 17, 18 are adapted to be interchangeably mounted on the supports c and b, respectively, to extend transversely of the top of the range R and to have longitudinal adjustment and adjustment to different positions longitudinally of the range by the adjustment of the supports on the rail 7. The bars engage the flat surface of the supporting brackets 8 between the lugs 10, and to permit of longitudinal adjustment of the bars relative to said surface 9 of the supports the one end portion of the bars engaging the supports is slotted, as at 17', 18', and the bars are secured in adjusted position on the supports by headed screws 19 engaging the slots in the bars and said screws having threaded connection with the wall of a socket 8' extended into the surface 9 of the supports 8 centrally thereof, as shown in Figures 4 and 5, the heads of the screws being provided with a wing 19' extended upwardly from the head of the screws and said wings having a slot therein for the engagement of a member to manipulate the screws. The bar 17 is of less length than the bar 18 and carries a pair of the arms 15, 16 at or adjacent the end thereof, and the bar 18 carrying two pair of said arms, one pair of arms at or adjacent the end and the other pair of arms intermediate the ends thereof.

To mount the arms 15, 16 on the bars 17, 18, shouldered studs 20 are mounted in openings in the bars with a portion of the studs extending from the under surface of the bars a distance substantially equal to the portion of the supports 8 extending above the top of the range and adapted to engage and support the bars upon the range. To pivotally mount the arms upon the studs 20, one arm, shown as the arm 16, has a bifurcated end, as shown at 16a, and the other arm 15 has a hub portion 15a at the end adapted to be engaged between the bifurcation legs 16a when the arms are pivotally engaged upon the studs 20. Each of the arms 15, 16 has a portion extending substantially in a straight plane radially from the pivot support of the arms to substantially midway the length of the arms, and said portion of said arms merges with an inwardly curved portion, as at 15", 16", the arms 16 being curved in a direction opposite to the arm 15, and the free end of the arms diverging from said curved portion relative to the radial portions. To retain the arms on the studs in engagement with the stud shoulder to permit of adjustment of the arms toward and away from each other to releasably grip and firmly hold a pot or pan on the range, and to adjust the arms to extend in different directions from the bars 17, 18 a headed screw 21 has threaded connection with a bore in the studs, the head of the screws having an upwardly extending wing 22 provided with a slot for the engagement of an implement to manipulate the screws and to forcibly clamp the pivot portion of the arms between the shoulder of the studs and head of the screws, and thereby lock the arms in adjusted position on the studs. The arms mounted on the bar 17 may be adjusted to extend from the end of the bar as shown and be engaged about a pot, shown in dot and dash lines P, and hold the pot to the range, or said arms may be adjusted to extend laterally from either side of the bar 17 and firmly grip and hold a pot to the range in said positions.

Two pair of arms are shown mounted on the bar 18, one pair of arms being mounted intermediate the ends of the bar and the other pair of arms being mounted on said bar at or adjacent the end thereof and to cause said latter pair of arms in the adjustment thereof to move in a higher plane than the pair of arms intermediate the ends of the bar, the stud 20 on which said arms are mounted is elongated and the shoulder on said stud engaged by and supporting the arms is disposed in a higher plane than the arm engaging and supporting shoulder of the stud for the pair of arms intermediate the ends of the bar. The arms mounted at or adjacent the end of the bar 18 are shown as extending to one side of the bar and adjusted to firmly grip and hold a pot of relatively large diameter to the range, as shown in dot and dash lines P', and it will be obvious that said arms may be adjusted to extend from the opposite side of the bar and adjusted to firmly grip and hold pots of different sizes to the range. To permit of adjustment of the arms 15, 16 to a position with the free ends disposed in overlapping relation to grip and hold a pot of relatively small diameter to the range, such as a coffee pot as shown in dot and dash lines P", the free end of one of the arms, shown as the arm 16, is arranged with a bifurcation, as at 16a, and the free end of the other arm 15 is reduced in width, as shown at 15a, and disposed to have movement in the plane of and engage in the space between the bifurcation legs 16a of the arm 16, as clearly shown in Figure 1. The shoulders at opposite sides of the reduced end portion 15a of arm 15 serve as stops to engage the other arm 16 and limit the movement of the arms in a direction toward each other.

To engage and hold to the range a frying pan or a spider, the side wall of which declines from the top to the bottom of the pan, a further pair of arms is provided, said arms being in the form of bars 23 mounted on the support a to extend transversely of the top of the range and have adjustment toward and away from each other. The bars are offset laterally intermediate the ends thereof in opposite directions, as at 23', and the offset portion 23" arranged of reduced thickness and to incline to conform to the inclination of the side wall of the pan. The end of the bars opposite the offset portion 23" has a part extending laterally at a right angle and in a direction opposite to the offset 23', and shown as consisting of plates 24 fixed at one end to the bars and having slots extended into the opposite ends. The slotted portions of the plates are disposed in superposed relation to the flat surface 9 of the supporting brackets a and have sliding movement between the lugs 10 parallelly of the rail 7, and are releasably secured to said supporting bracket by a screw 19 engaging the slots of the superposed plates and threaded bore 8' in the support. The free ends of the offset portions 23" are arranged with a portion to extend transversely of the bars, as at 23a, with a portion extending below said offset portion of the bars to engage the top of the range and a portion extending above the offset portion and the free end thereof offset laterally, as at 23b, to permit of the engagement of a cover on the pan. To adjust the arms 23 to accommodate pans of different widths, or spiders of different diameter, the screw 19 is loosened to permit the arms to be moved away from each other and the pan or spider engaged between the arms, as shown in dot and dash lines S, when the arms are adjusted to engage the opposite sides of the pan with an end wall of the pan abutting the offset portion 23' of the arms and locked in adjusted position by the screws 19 clamping the arm plates 24 to the flat surface 9 of the supporting bracket, the arms holding the pan against lateral movement on the range. To hold the pan or spider to the range and prevent movement of the same outwardly from between the arms, holding members in the form of plates 25 having stepped notches of hook form 25' arranged on the front edge thereof secured sidewise to the side of the bars 23 at and within the juncture of the offset portion 23' to extend vertically therefrom and have vertical adjustment by screws engaging slots extended into the bottom edge of the plates and threaded into openings in the bars, as at 26. The hook portions 25' of the plates are adapted to be engaged over the edge of a side wall portion of the pan.

It will be obvious that the carrying bars 17, 18 for the arms 15, 16 may be interchangeably mounted on the supports 8 on the rail 7 with the arms 23. For instance, the arms 23 may be mounted on the support c and the bar 17 on the support a when the utensil gripping holding arms 15, 16 on bar 18 are adjusted to extend laterally from the side of the bar 18 opposite to that shown in Figure 1, or the arms 23 may be mounted on the support b and the bar 18 carrying the utensil gripping and holding arms 15, 16 on the support a.

By the arrangement of mounting and supporting the bars 17, 18 so that they are disposed in a plane above the top of the range, and the pivotal mounting of the arms 15, 16 on the studs 20 above said bars, the arms are adapted to be engaged with and grip pots at points above the bottom of the pots thereby not only holding the pots from moving laterally to and fro on the range with a consequent sloshing and spilling of liquid from the pots and possible movement of the pots from the range, but also prevents the tops from tipping over on the range. The arms 23 also hold the pans against lateral movement while the engagement of the hooks of the plates 25 with the pan prevent the pan from moving outwardly from between the arms and from the range and also hold the pan on the range.

Having described my invention, I claim:

1. In means for holding cooking utensils on a galley range having a rail extending longitudinally of and spaced laterally from the range, a bar, a support adjustable longitudinally on the rail, means to adjustably mount the bar upon said support with the bar extending transversely of the top of the range and having adjustment on the support and adapted to be moved with the support when the support is adjusted on the rail to be disposed in different positions relative to the top of the range, a member adjustably mounted on the bar to engage cooking utensils of different sizes and hold said cooking utensils upon different portions of the range, and means to releasably secure said member in adjusted position on the bar.

2. In a galley range, a range, a pair of utensil engaging and holding bars, a support mounted on and disposed at a side of the range and having a plurality of lugs extending from the support in spaced relation to each other, one end of the bars being arranged to be slidably mounted in the same space between said lugs on the support, means for releasably securing said bars at said end on the said support with the bars extending in parallel spaced relation transversely of the top of the range and having sliding adjustment toward and away from each other on the support to engage at the opposite sides of a cooking utensil and hold the cooking utensil against lateral movement on the range.

3. In a galley range, a range, means for holding utensils against lateral movement on the range, comprising a pair of bars each bar having a slotted portion extending at a right angle laterally from one end of the bar, a support mounted on and disposed at a side of the range and having a portion arranged for the slidable engagement of the right angle portions of the bars to provide for the adjustment of the bars toward and away from each other, and means engaging the slots in the right angle portions of said bars and having threaded connection with the support to secure the bars in adjusted position on the support, and said bars adapted to engage at the opposite sides of a cooking utensil and hold said cooking utensil against lateral movement on the range.

4. In a galley range, a range, a support mounted on the side of the range, a pair of bars mounted at one end upon said support with the bars extending transversely of the top of the range and having adjustment toward and away from each other to engage opposite sides of cooking utensils and hold said cooking utensils against lateral movement on the range, and members mounted on said bars and having hook portions to engage over the edge of a side wall portion of a cooking utensil and hold the cooking utensil upon the range between the bars.

5. In a galley range, a range, a support mounted on and spaced laterally from the range and having a socket therein, a pair of bars, each bar having one end portion offset laterally intermediate the ends of the bars and having a slotted plate portion extending laterally at a right angle from the opposite end of each bar in a direction opposite to the offset to be engaged in overlapped relation on the support, a headed screw engaging the slots of the slotted plate portions of the bars and threaded into the socket in the support to releasably mount said bars upon the support with the bars extending transversely of the top of the range and having adjustment toward and away from each other to engage opposite sides of cooking utensils of different sizes on the range, and plates fixed to the side of the bars between the offset end portions and the slotted plate portions to extend upwardly from the bars and forwardly of the offsets, and said plates having notches in the forward edge adapted to engage over the edge of a side wall portion of a cooking utensil and hold said cooking utensil between the bars to the range.

6. In a galley range, a range, a support mounted on and spaced laterally from a side of the range, a pair of bars having a slotted right angle portion at one end to be slidably engaged on the support, means engaging the slots of the angle portions of the bars and having threaded connection with the support to releasably mount and secure said bars upon the support with the bars extending transversely of the top of the range and having sliding adjustment on the support toward and away from each other to engage opposite sides of cooking utensils of different sizes on the range, and plates fixed to and extending upwardly from the bars, said plates having notches in an edge thereof adapted to engage over the edge of a side wall portion of a cooking utensil and hold said cooking utensil between the bars to the range.

ALBERT WESTLAKE.